(12) United States Patent
Caponetti et al.

(10) Patent No.: US 11,913,428 B2
(45) Date of Patent: Feb. 27, 2024

(54) WIND TURBINE BLADE DESIGN

(71) Applicant: Vestas Wind Systems A/S, Aarhus N. (DK)

(72) Inventors: Fabio Caponetti, Åbyhøj (DK); Cliff Zimsen, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1 day.

(21) Appl. No.: 17/272,455

(22) PCT Filed: Aug. 30, 2019

(86) PCT No.: PCT/DK2019/050256
§ 371 (c)(1),
(2) Date: Mar. 1, 2021

(87) PCT Pub. No.: WO2020/048571
PCT Pub. Date: Mar. 12, 2020

(65) Prior Publication Data
US 2021/0317814 A1 Oct. 14, 2021

(30) Foreign Application Priority Data
Sep. 3, 2018 (DK) .................. PA 2018 70568

(51) Int. Cl.
*F03D 1/06* (2006.01)

(52) U.S. Cl.
CPC ......... *F03D 1/0675* (2013.01); *F03D 1/0658* (2013.01); *F05B 2230/20* (2013.01); *F05B 2240/211* (2013.01); *F05B 2280/6013* (2013.01)

(58) Field of Classification Search
CPC .... F03D 1/0675; F03D 1/0666; F03D 1/0658; F05B 2230/00; F05B 2230/20;
(Continued)

(56) References Cited

U.S. PATENT DOCUMENTS

| | | | | |
|---|---|---|---|---|
| H2057 H | * | 1/2003 | Veers | F03D 7/0224 |
| | | | | 416/240 |
| 10,730,247 B2 | * | 8/2020 | Hansen | B29C 70/22 |

(Continued)

FOREIGN PATENT DOCUMENTS

| | | | | |
|---|---|---|---|---|
| CN | 102192078 A | * | 9/2011 | ........... B29C 70/302 |
| KR | 20140111829 A | * | 3/2013 | |

(Continued)

OTHER PUBLICATIONS

Bagherpour et al. Modeling of material bend-twist coupling on wind turbine blades, Elsevier, Composite structure 193 (2018) 237-246 (Year: 2018).*

(Continued)

*Primary Examiner* — David E Sosnowski
*Assistant Examiner* — Wayne A Lambert
(74) *Attorney, Agent, or Firm* — Wood Herron & Evans LLP (57) ABSTRACT

A plurality of wind turbine blades or blade portions have substantially the same size and outer geometrical shape, and corresponding plies of the blades or blade portions having the same position within the respective wind turbine blades or blade portions have different fibre orientation angles relative to a pitch axis of the respective wind turbine blade or blade portion. By changing the fibre orientation angles of the corresponding plies a bend-to-twist coupling of the blade or blade portions may be varied amongst the plurality of blades or blade portions. The blades may then be tailored according to their siting within or on a wind turbine park. A common mould shape may be used across the plurality of wind turbine blades or blade portions, together with a more streamlined blade design process.

14 Claims, 7 Drawing Sheets

(58) Field of Classification Search
CPC ........ F05B 2240/211; F05B 2280/6013; F05B 2280/5001; F05B 2280/6003; Y02E 10/72; Y02P 70/50
See application file for complete search history.

(56) References Cited

U.S. PATENT DOCUMENTS

| | | | |
|---|---|---|---|
| 2006/0133937 A1 | 6/2006 | DeLeonardo et al. | |
| 2011/0042524 A1* | 2/2011 | Hemmelgarn | B64C 3/48 244/203 |
| 2011/0084174 A1* | 4/2011 | Hemmelgarn | F03D 1/0675 416/241 R |
| 2011/0123344 A1* | 5/2011 | Yerramalli | F03B 3/121 156/92 |
| 2012/0131782 A1* | 5/2012 | Petersen | B29C 33/307 29/407.01 |
| 2012/0177872 A1 | 7/2012 | Tsai et al. | |
| 2014/0140855 A1 | 5/2014 | Arendt et al. | |
| 2018/0045182 A1 | 2/2018 | Westergaard | |
| 2019/0277248 A1* | 9/2019 | Herrig | F03D 1/0675 |

FOREIGN PATENT DOCUMENTS

| | | | |
|---|---|---|---|
| WO | 2013007263 A2 | 1/2013 | |
| WO | WO-2013007351 A1 * | 1/2013 | ........... B29C 31/085 |
| WO | WO-2013060332 A1 * | 5/2013 | ........... F03D 1/0675 |
| WO | WO-2021121545 A1 * | 6/2021 | |

OTHER PUBLICATIONS

Chen et al. Study on composite bend-twist coupled wind turbine blade for passive load mitigation, Elsevier, Composite structure 213 (2019) 173-189 (Year: 2019).*
Da Silva et al. Wind Turbine Passive Control Using Aeroelastic Tailoring, ABCM, National Congress of Mechanical Engineering, CONEM 2010 (Year: 2010).*
Ha KR_20140111829_A_I English Machine Translation (Year: 2013).*
Fedorov Bend-wist Coupling Effects in Wind Turbine Blades, Jul. 10, 2012, Department of Wind Energy Technical University of Denmark; Kgs. Lyngby, Denmark, p. 1-153 (Year: 2012).*
Danish Patent and Trademark Office, Search and Examination Report in PA 2018 70568, dated May 14, 2019.
European Patent Office, International Search Report and Written Opinion in PCT Application No. PCT/DK2019/050256, dated Nov. 4, 2019.
Donald Lobitz, Aeroelastic Tailoring in Wind-Turbine Blade Applications, May 1, 1998 (May 1, 1998), pp. 1-13, XP055632102, Retrieved from Internet: URL:http://windpower.sandia.gov/other/AWEA4-98. pdf [retrieved on Oct. 15, 2019].

* cited by examiner

Fig. 8

WIND TURBINE BLADE DESIGN

FIELD OF THE INVENTION

The present invention relates to a kit of parts for a plurality of wind turbine blades or blade portions, a plurality of wind turbine blades or rotors formed from the kit of parts, a wind turbine park including wind turbines having the wind turbine rotors, and a method of forming a plurality of wind turbine blades or blade portions.

BACKGROUND OF THE INVENTION

Existing wind turbine blades have their own specific geometries and specific structural properties. The complete design procedure for a wind turbine blade therefore requires a significant amount of design time and computational resources. Therefore, once a wind turbine blade has been designed, the overall design will be adhered to throughout manufacture of the blade.

In general, a design process produces only one blade design of a given geometry and structure, and all wind turbine rotors including blades made according to the blade design are substantially identical.

SUMMARY OF THE INVENTION

A plurality of wind turbine blades or a plurality of wind turbine blade portions have corresponding plies with different fibre orientation angles such that the blades or blade portions have different bend-to-twist couplings.

A first aspect of the invention provides a kit of parts for a plurality of wind turbine blades, comprising a plurality of wind turbine blades or a plurality of wind turbine blade portions each having: a plurality of composite plies, each ply having a position within the respective wind turbine blade or the respective wind turbine blade portion and a fibre orientation angle relative to a pitch axis of the respective wind turbine blade or the respective wind turbine blade portion, wherein each of the wind turbine blades or each of the wind turbine blade portions have substantially the same size and outer geometrical shape and corresponding pitch axes, and wherein at least one ply of each of the respective wind turbine blades or each of the respective wind turbine blade portions corresponds, which corresponding plies have the same position within the respective wind turbine blades or wind turbine blade portions and have different fibre orientation angles such that the wind turbine blades or wind turbine blade portions have different bend-to-twist couplings.

With such an arrangement, there is provided a plurality of wind turbine blades or wind turbine blade portions which have different 'bend-to-twist coupling' and the same geometrical outer shape. Bend-to-twist coupling refers to the coupling between flap loading of the blade (or deflection) and the twist of the blade. In other words, flapwise loading of the blade causes the blade to twist about a spanwise axis of the blade. This coupling will have a load relieving effect if implemented in a favourable direction because any blade deflection from e.g. wind gusts will cause the blade to twist towards lower angles-of-attack which relieves the flap loading on the blade. This load relieving effect is passive and can be used to provide lower fatigue loads on blades, the main shaft, the main frame, the tower and foundation for the same annual energy production (AEP) level, resulting in corresponding component cost reductions.

By changing the fibre orientation angle of one or more plies in the ply layup, but keeping the outer geometry the same, a set of blades or blade portions can be produced with different bend-to-twist couplings. Hence, blades can be designed for a greater range of applications with less time and fewer resources required. There is also the further advantage that the same moulds may be used for manufacturing a set of the wind turbine blades or blade portions with different properties.

Whilst it is of course possible to make other changes to the blade structure, e.g. to change the ply stack thickness so as to vary the blade stiffness in the spanwise direction, as well as changing the fibre orientation angle of one or more plies in the ply layup, it is particularly advantageous to change only the fibre orientation angle of one or more plies in the ply layup so as to change the bend-to-twist coupling of the blade.

Fibre orientation angle here is used to refer to the angle between (one of) the fibre direction(s) of the ply and the pitch axis of the blade or blade portion.

The fibre orientation angles of the corresponding plies may differ by at least 5°.

The fibre orientation of the corresponding plies may differ by less than 35°.

The corresponding plies may be unidirectional, biaxial or triaxial plies.

The corresponding plies may be located in blade shell portions of the respective wind turbine blades or the respective wind turbine blade portions.

In an example, the wind turbine blades or wind turbine blade portions may have different bend-to-twist couplings.

The corresponding plies may have substantially the same ply thickness, matrix material and fibre material. The matrix material may be epoxy or polyester resin for example.

The fibre material may be glass or carbon for example.

The corresponding plies may differ by one or more of their ply thickness, matrix material or fibre material.

Each wind turbine blade or wind turbine blade portion may have a plurality of plies which correspond.

The wind turbine blade portions may be wind turbine blade tip portions.

The kit of parts may further comprise a plurality of substantially identical wind turbine blade root portions, wherein each wind turbine blade tip portion is coupleable to one of the wind turbine blade root portions.

According to a second aspect of the present invention, there is provided a plurality of wind turbine blades formed at least partially from the kit of parts according to the first aspect, with each blade comprising one of the plurality of wind turbine blades or one of the plurality of wind turbine blade portions.

According to a third aspect of the present invention, there is provided a plurality of wind turbine rotors, each rotor comprising a plurality of wind turbine blades, the blades of each rotor being substantially identical, and the blades being formed at least partially from the kit of parts according to the first aspect, and the blades of different rotors comprising a respective one of the plurality of wind turbine blades or one of the wind turbine blade portions. The blades of the same rotor may be said to be substantially identical if they have the substantially the same design, shape, layup, etc. and differ by small differences only, e.g. with regard to manufacturing tolerances.

According to a fourth aspect of the invention, there is provided a wind turbine park, comprising a plurality of wind turbines comprising the plurality of wind turbine rotors of the third aspect, each wind turbine having one of the plurality of wind turbine rotors, and an adjacent pair of the wind turbines being spaced apart by a distance less than 5 times a diameter of one of the wind turbine rotors, preferably less than 3 times a diameter of one of the wind turbine rotors. With such an arrangement, wind turbines within the same park may be formed having wind turbine blades which can be manufactured by substantially the same method, which can have their bend-to-twist coupling customised such as to be pad specific.

The wind turbine park may have a predominant wind direction and a first wind turbine positioned relative to a second wind turbine in an upwind direction, according to the predominant wind direction, may have blades which have a greater bend-to-twist coupling than the blades of the second wind turbine.

According to a fifth aspect of the invention, there is provided a method of forming a plurality of wind turbine blades or a plurality of wind turbine blade portions, comprising: providing a mould for forming a wind turbine blade or a wind turbine blade portion having a pitch axis; laying up a plurality of plies in the mould, each ply having a position within the plurality of plies and a fibre orientation angle relative to the pitch axis; forming a wind turbine blade or a wind turbine blade portion from the plies; removing the wind turbine blade or the wind turbine blade portion from the mould; laying up a plurality of further plies in the mould or a further mould for forming a wind turbine blade or a wind turbine blade portion substantially identical in shape and size to the wind turbine blade or the wind turbine blade portion, each further ply having a position within the plurality of further plies and a fibre orientation angle relative to the pitch axis; and forming a further wind turbine blade or a further wind turbine blade portion from the further plies; wherein at least one ply of each of the respective wind turbine blades or the respective wind turbine blade portions corresponds, which corresponding plies have the same position within the wind turbine blades or the wind turbine blade portions and have different fibre orientation angles such that the wind turbine blades or wind turbine blade portions have different bend-to-twist couplings.

Accordingly, there is provided a method which allows blades having different properties to be produced without any redesign of a mould for the blades being necessary.

It will be understood that the method can use either a single mould multiple times, or multiple moulds, each functioning to produce substantially identically shaped blades.

According to a sixth aspect of the invention, there is provided a kit of parts for a plurality of wind turbine blades, comprising a plurality of wind turbine blades or a plurality of wind turbine blade portions each having: a plurality of composite plies, each ply having a position within the respective wind turbine blade or the respective wind turbine blade portion, at least one composite ply of the plurality of composite plies being a multiaxial ply having a plurality of fibres aligned in multiple axial directions, wherein each of the wind turbine blades or each of the wind turbine blade portions have substantially the same outer geometrical shape, and wherein at least one multiaxial ply of each of the respective wind turbine blades or the respective wind turbine blade portions corresponds, which corresponding plies have the same position within the respective wind turbine blades or the respective wind turbine blade portions and have different fibre stiffness in at least one corresponding axial direction such that the wind turbine blades or wind turbine blade portions have different bend-to-twist couplings.

With such an arrangement, there is provided a kit of parts for producing a plurality of wind turbine blades which have different bend-to-twist coupling while having the same outer geometrical shape, the differing bend-to-twist coupling being achieved by the differing fibre stiffness.

According to a seventh aspect of the present invention, there is provided a wind turbine park comprising: first and second wind turbines separated by a distance of less than 5 times a diameter of one of the wind turbine rotors, preferably less than 3 times a diameter of one of the wind turbine rotors; wherein the first and second wind turbines have first and second sets of blades respectively; the first and second sets of blades having substantially the same size and outer geometrical shape; and the first and second sets of blades having different degrees of bend-to-twist coupling.

With such an arrangement, there is provided a wind turbine park wherein the wind turbines have substantially the same design, but the blades may be customised to be pad specific.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, chord, spanwise and pitch axis are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

The term pitch axis is used to refer to the axis of rotation of the wind turbine blade on a bearing mounting connection to the hub. The pitch axis extends generally in the spanwise direction of the blade. Rotation of the blade about the pitch axis varies the angle of attack of the blade.

Figure 1:
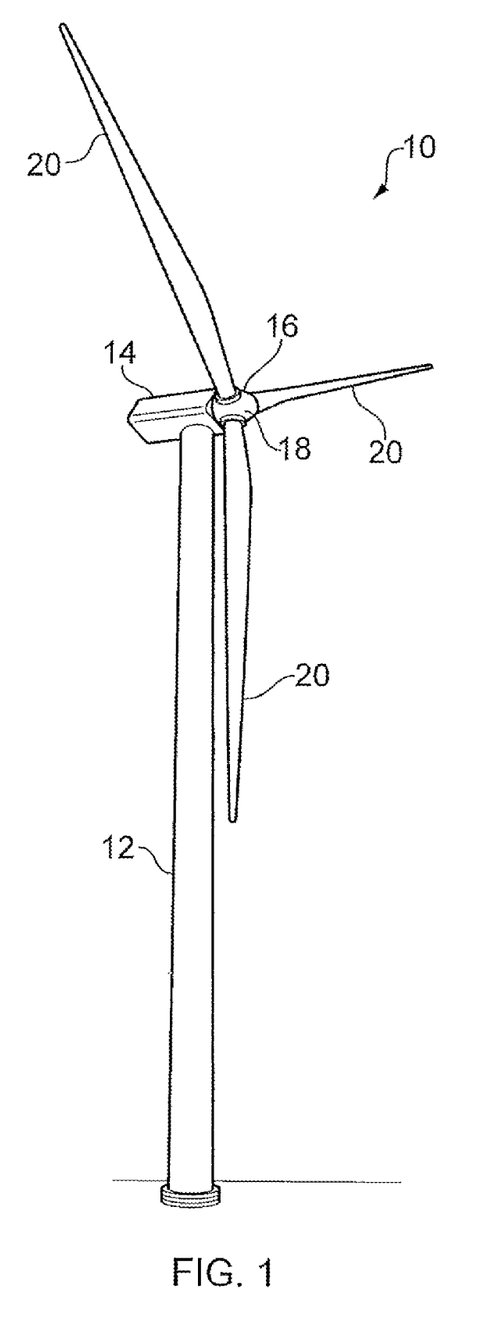
FIG. 1 shows a wind turbine.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled via a gearbox to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAVVT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
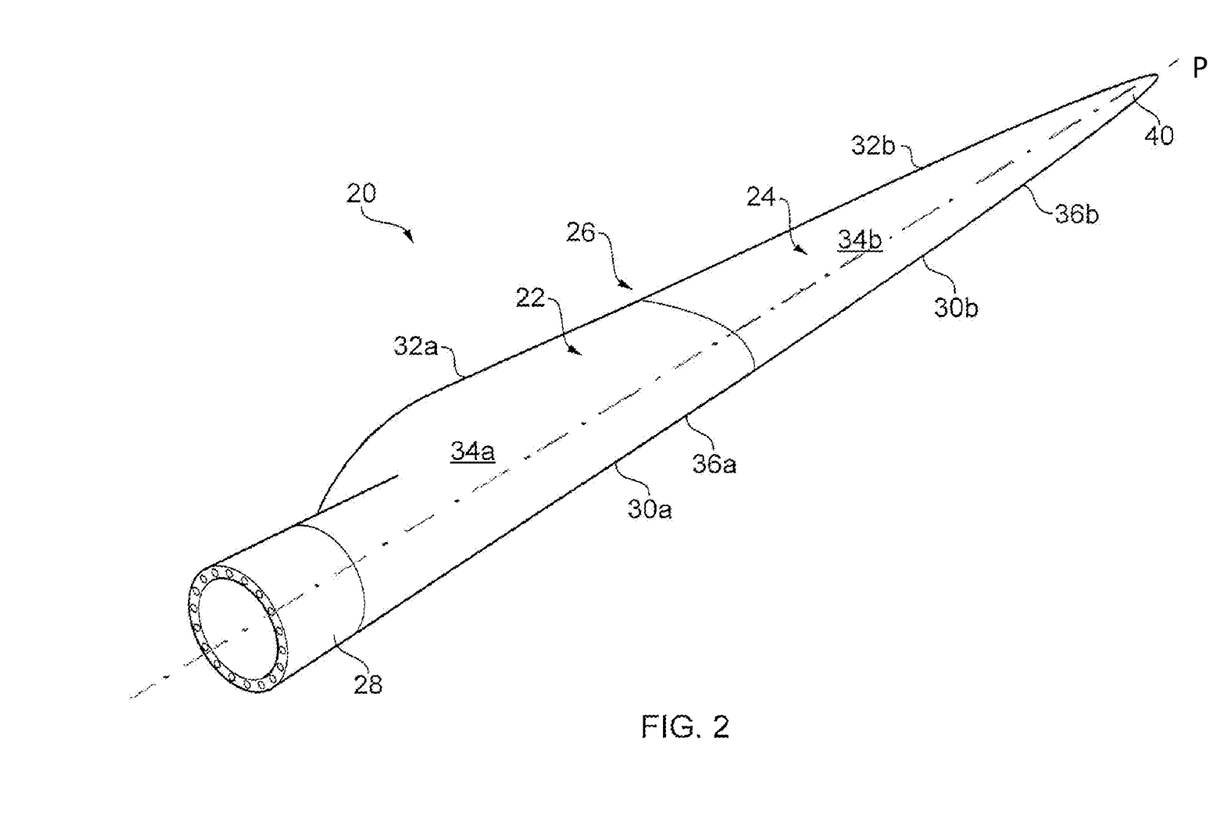
FIG. 2 shows a wind turbine blade.

FIG. 2 illustrates one of the wind turbine blades 20 for use in such a wind turbine. Each of the blades 20 has a root end 28 proximal to the hub 18 and a tip end 40 distal from the hub 18. A leading edge and a trailing edge extend between the root end 28 and tip end 40, and each of the blades 20 has a respective aerodynamic high pressure surface (i.e. the pressure surface) and an aerodynamic low pressure surface (i.e. the suction surface) surface extending between the leading and trailing edges of the blade 20.

Each blade has a cross section which is substantially circular near the root end 28, because the blade near the root must have sufficient structural strength to support the blade outboard of that section and to transfer loads into the hub 18. The blade 20 transitions from a circular profile to an aerofoil profile moving from the root end 28 of the blade towards a "shoulder" of the blade, which is the widest part of the blade where the blade has its maximum chord. The blade 20 has an aerofoil profile of progressively decreasing thickness in an outboard portion of the blade, which extends from the shoulder to the tip end 22.

The wind turbine blade 20 may be a 'split' or 'segmented' blade which comprises a plurality of blade portions which are joined together to form the complete blade. In the example depicted in FIG. 2, the wind turbine blade 20 includes a first wind turbine blade portion 22 and a second wind turbine blade portion 24, which may be connected at a joint interface to form the blade 20.

The first blade portion 22 includes the root end 28, a leading edge 30a, a trailing edge 32a, a suction side 34a and a pressure side 36a. Similarly, the second blade portion 24 has the tip end 40, a leading edge 30b, a trailing edge 32b, a suction side 34b and a pressure side 36b. The two blade portions may be joined at a joint 26.

While the example shown in FIG. 2 has two blade portions, it will be understood that a blade may have three or more blade portions with a joint between adjacent blade portions.

Figure 3:
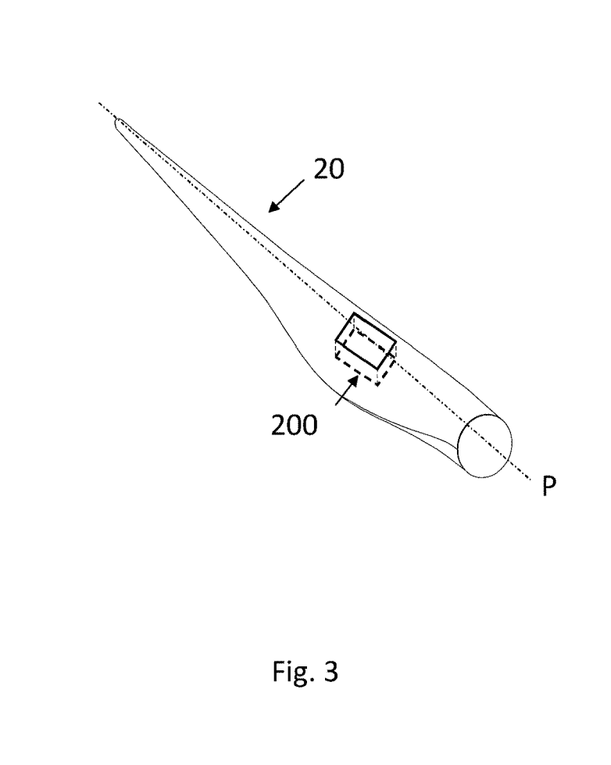
FIG. 3 shows a wind turbine blade.

The wind turbine blade 20, or its blade portions, includes a blade shell and a shear web extending internally between upper and lower parts of the blade shell. The blade shell may comprise two half-shells which are separately moulded before being joined together (at the leading edge and the trailing edge) to form the blade or blade portion. It will be appreciated that the blade shell need not be formed as two half-shells which are subsequently joined together but may be formed as a unitary shell structure, together with the shear web, in a "one shot" single shell process. The blade shell may include a laminate composite material such as glass fibre and/or carbon fibre for example. FIG. 3 shows a composite blade 20 and a portion 200 of the composite shell of the blade.

Figure 4:
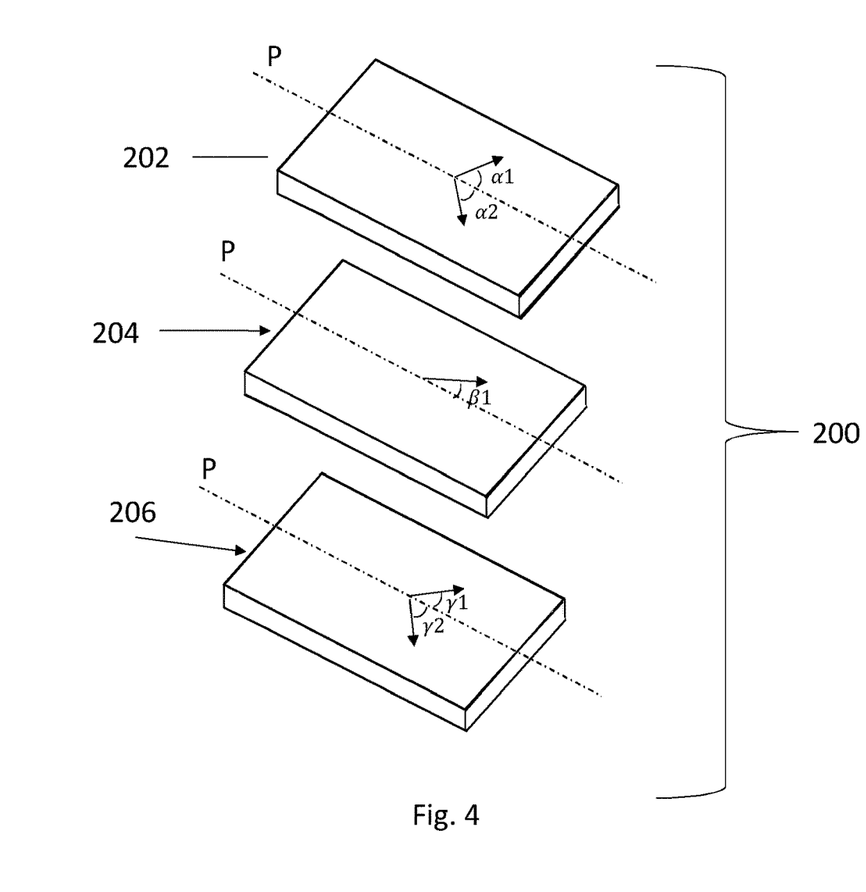
FIG. 4 shows an exemplary set of plies within a fibre layup.

FIG. 4 is a schematic view of an example layup through the portion 200 of the composite shell, showing three of the plies 202, 204, 206. Of course, the layup may include a greater or lesser number of plies and the illustration shown is for ease of explanation. Each of the plies has a fibre orientation angle and by changing the fibre orientation angle of one or more of the plies 202, 204, 206 the blade 20, or a portion thereof, may exhibit a different bend-twist coupling as compared with another blade or blade portion in which a corresponding ply or plies have a different fibre orientation angle.

The term 'corresponding plies' refers to the positional relationship of the plies having the different fibre orientation angles amongst the stack of plies of the plurality of blades or blade portions. This may be a one-to-one relationship or a one-to-many relationship between the plies having the different fibre orientation angles. For example, a single ply at a specific location in the stack of plies may have a first fibre orientation angle in a first blade or blade portion, and a single ply at the same location in the stack of plies in a second blade or blade portion may have a second fibre orientation angle different than the first fibre orientation angle.

Alternatively, a group of plies at a specific location in the stack of plies may have a first set of fibre orientation angles in a first blade or blade portion, and a group of plies at the same location in the stack of plies in a second blade or blade portion may have a second set of fibre orientation angles different than the first set of fibre orientation angles. The number and/or thickness of the plies in the groups of plies may be the same or different between the first blade or blade portion and the second blade or blade portion.

Yet further alternatively, a single ply at a specific location in the stack of plies may have a first fibre orientation angle in a first blade or blade portion, and a group of plies at the same location in the stack of plies in a second blade or blade portion may have a second set of fibre orientation angles, at least one of which is different than the first fibre orientation angle. The thickness of the single ply in the first blade or blade portion may be the same or different than the thickness of the group of plies at the same location in the stack of plies in the second blade or blade portion.

Figure 5:
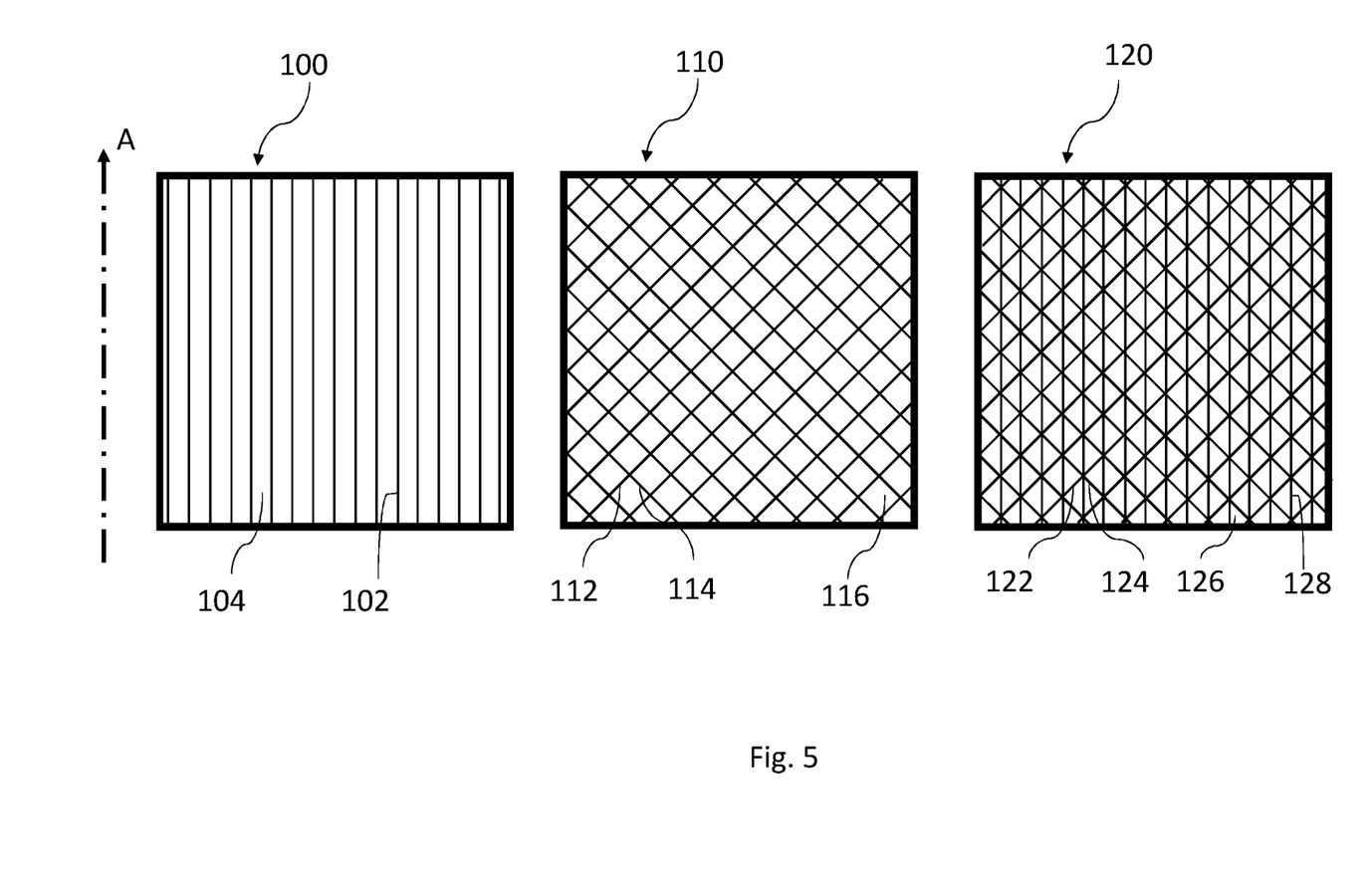
FIG. 5 shows examples of different plies.

FIG. 5 shows three different generic types of plies commonly used in composite layups. The first ply is a unidirectional ply 100, having a series of parallel fibres 102 all aligned parallel to a primary axis A. In the case of a pre-preg, the fibres are embedded in a matrix material 104. Otherwise the matrix material 104 is later infused. Plies such as the unidirectional ply 100 will be relatively stiff along the length of the fibres 102 (here aligned with the primary axis A) but relatively flexible in a direction perpendicular to the direction of the fibres 102, here the direction perpendicular to the axis A in the plane of the ply.

The second ply is a biaxial ply 110. The biaxial ply 110 has a first set of fibres 112 oriented at 45° to the primary axis A and a second set of parallel fibres 114 oriented at 45° to the axis A in the opposite direction. In the case of a pre-preg, the fibres 112, 114 are embedded in a matrix material 116. Otherwise the matrix material 116 is later infused.

The biaxial ply 110 would be referred to customarily as a +45/−45 ply, since the two parallel sets of fibres 112, 114 are each oriented at 45° to the primary axis A in opposite directions. Biaxial plies are also known where the fibres are not perpendicular, such as +30/−30 biaxial plies or +60/−60 biaxial plies.

Biaxial plies will exhibit a lower degree of anisotropy than unidirectional plies. For a +45/−45 ply, the ply will exhibit high stiffness in both the +45° and −45° directions. However, in the 0° direction along the primary axis A and the 90° direction perpendicular to the primary axis A, the ply will have a lower stiffness than in the +45° or −45° directions.

The third ply is a triaixial ply 120. The example triaxial ply 120 has a first set of fibres 122 oriented at 45° to the primary axis A, a second set of fibres 124 oriented at 45° to the primary A in the opposite direction, and a third set of parallel fibres 128 oriented substantially parallel to the primary axis A. The triaxial ply 120 will be relatively stiff in the directions along the fibres (i.e. at 0°, +45°, −45°) but may be more flexible in directions not along the fibres, being most flexible at 90° to the primary axis A. In the case of a pre-preg, the fibres of the triaxial ply 120 are embedded in a matrix material 126. Otherwise the matrix material 126 is later infused.

A triaxial ply may also have fibres oriented at 0°, +60°, −60°. Such a ply may be referred to as quasi-isotropic. This means that the ply will have a smaller difference in flexibility between its axes of highest stiffness and axes of lowest stiffness than other plies such as unidirectional plies. The orientation of such a quasi-isotropic ply may have a smaller effect on bend-to-twist coupling of a blade than the orientation of a ply having a higher degree of anisotropy. Biaxial plies having fibres at +45°, −45° may also be considered as being quasi-isotropic.

Returning to FIG. 4, the first composite ply 202 may be a biaxial ply, such as a +45/−45 ply, as indicated by angles α1 and α2 relative to pitch axis P. Where α1 and α2 are equal and opposite angles the biaxial ply has a primary axis A aligned with respect to the pitch axis P. However, where α1 and α2 are not equal and opposite angles the biaxial ply has a primary axis A inclined 'off-axis' with respect to the pitch axis P.

Adjusting the fibre orientation angles α1 and α2 in this way may lead to a change in the bend-to-twist coupling of the blade 20, or a portion thereof. Equally, the fibres may be arranged at +30°, −30°. Whenever the fibres are arranged at equal and opposite angles, the ply may be referred to as "balanced" about the pitch axis P.

The second composite ply 204 may be a unidirectional ply 204, with the fibres oriented along angle β1 with respect to the pitch axis P, where β1 may be zero or non-zero. Where the fibre orientation angle β1 is zero the fibres of the unidirectional ply are aligned with the pitch axis P. Where the fibre orientation angle β1 is non-zero the stiffest direction of the unidirectional ply 204 is inclined with respect to the pitch axis P. Changing the fibre orientation angle β1 such that the direction of highest stiffness of the ply changes with respect to the pitch axis P may result in a change in the bend-to-twist coupling of the blade.

The third ply 206 may be another biaxial ply 206, having fibres oriented at angles γ1 and γ2 relative to the pitch axis P. The angles γ1 and γ2 may be identical to the angles α1 and α2, or may be different.

It will be understood that whilst in the above examples the pitch axis P is used as the reference for the fibre orientation angle for the corresponding plies, any generally spanwise axis of corresponding blades or blade portions may be taken as the reference axis. For example, the linear trailing edge of the blade outboard of the shoulder may be taken as a suitable alternative reference axis as this will be common amongst a plurality of blades or blade portions having the same shape.

The ability to change the bend-to-twist coupling of a blade or blade portion by changing the fibre orientation angle of one or more of the plies opens up several possibilities in terms of blade design.

A plurality of blades or blade portions may have substantially the same size and outer geometrical shape and corresponding pitch axes. They may be constructed from the same or similarly shaped moulds. A majority of the blade or blade portion may remain substantially identical amongst the plurality of blades or blade portions. By changing the fibre orientation angle of one or more of the plies to be 'off-axis' or inclined with respect to the pitch axis P means that the bend-to-twist coupling may be varied amongst the plurality of blades or blade portions.

In an example, and referring to FIG. 4, a first blade or blade portion may have identical first and third plies 202 and 206 with a second blade or blade portion but the second plies 204 have differing fibre orientation angles β1 between the first blade or blade potion and the second blade or blade portion. The differing angles β1 may give rise to the different bend-to-twist coupling between the blades or blade portions.

It will be understood that the second plies 204 of different blades 20 could be identified as 'corresponding plies' due to their similar positions within the composite layup.

In another example, in a first blade or blade portion the unidirectional ply 204 may be replaced in a second blade or blade portion by a biaxial ply or a triaxial ply. It will still be recognised that the ply of the second blade or blade portion would be in the same position in the layup as the ply 204 of the first blade or blade portion and would therefore be seen as corresponding. It is to be noted that the primary axis of the unidirectional ply in the first blade or blade portion and the primary axis of the biaxial or triaxial ply in the second blade or blade portion may be aligned with each other and/or may be aligned with the pitch axis of the respective blades or blade portions; or may be inclined at an angle with each other and/or may be inclined at an angle with the respective pitch axes.

In an example the fibre orientation angle of only a single ply might differ between the two blades or blade portions, or the fibre orientation angle of more than one ply may differ between the blades. For example, one ply may be substituted for two plies to achieve the different fibre orientation angles between the two blades or blade portions, e.g. the first biaxial +45/−45 ply 202 could be replaced by two unidirectional plies oriented at +60° and −30° to the pitch axis P, giving the result that the overall direction of higher stiffness as a result of the two plies is offset from the pitch axis P and so may give rise to a change in the bend-to-twist coupling for the blade or blade portion.

In an example, a single triaxial ply in the layup of the blade shell is re-oriented in the blade shell manufacturing to provide a different fibre orientation angle amongst a plurality of blades to achieve the variation in bend-to-twist coupling across the plurality of blades. Offsetting the fibre orientation of a single ply with respect to the pitch axis beneficially has no impact on the mould design nor the actual production procedure and materials when achieved by manipulating the fibre layup.

In an example, blade portions of a split or segmented blade are formed, including e.g. a first portion which extends from the root end to the midpoint of the blade and a second portion which extends from the midpoint of the blade to the tip end.

The number of permutations for the design of the blades or blade portions as a result of the different fibre orientation angles giving rise to different bend-to-twist couplings is preferably limited to a pre-defined number of layups which can be readily pre-made during the blade design phase to ensure stability and structural soundness. The number of permutations could be limited, for example to a set of standing bend-to-twist couplings, e.g. minimum, medium and extreme to choose from, thus limiting the amount of options to evaluate during the blade design process.

Figure 6:
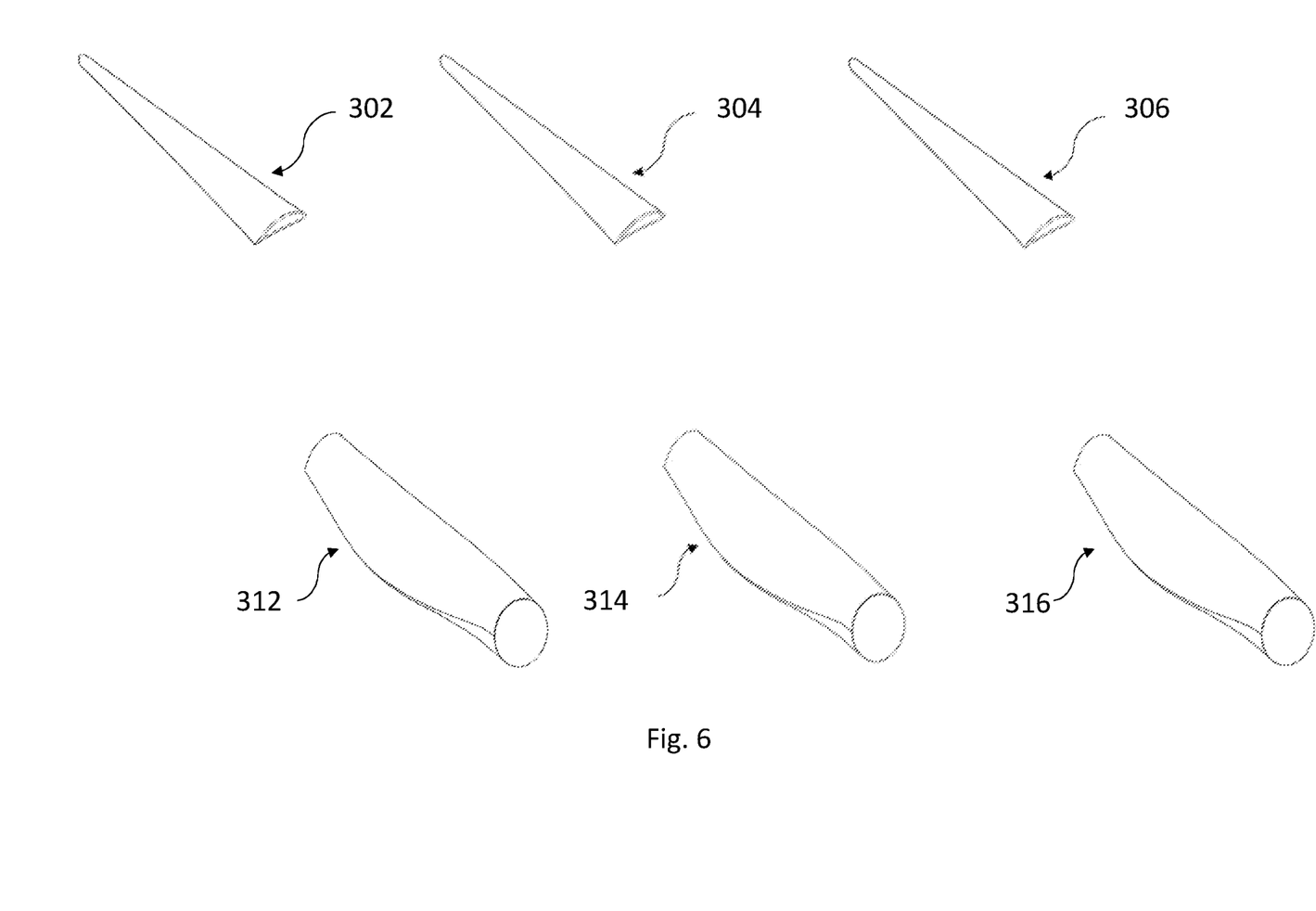
FIG. 6 shows wind turbine blade sections which may be used to form a wind turbine blade.

FIG. 6 shows how a plurality of blade portions may be formed. There is shown first, second and third blade tip portions 302, 304, 306 and first, second and third blade root portions 312, 314, 316.

By forming the tip and root portions separately, they may be matched in order to provide customisable blades. For example, the first, second and third root portions 312, 314, 316 may be substantially identical, whereas the tip portions 302, 304, 306 may have different degrees of bend-to-twist coupling. Therefore, when the respective first tip and root portions 302, 312, the second tip and root portions, 304, 314 and the third respective tip and root portions 306, 316 are connected three blades may be formed that have different degrees of bend-to-twist coupling while having substantially identical root sections and substantially identical overall blade size, outer geometrical shape and pitch axes. Therefore, the amount of redesigning required for customising a blade is significantly reduced.

Alternatively, the root portions 312, 314, 316 may be customised to have different degrees of bend-to-twist coupling to mate with a set of substantially identical tip sections 302, 304, 306. Yet further alternatively, a set of root extension modules may be customised to have different degrees of bend-to-twist coupling to mate with a set of substantially identical blade portions.

Using the blades disclosed above, wind turbines may be customised to their particular position or site for specific wind turbine parks or specific pad positions within wind turbine parks.

Figure 7:
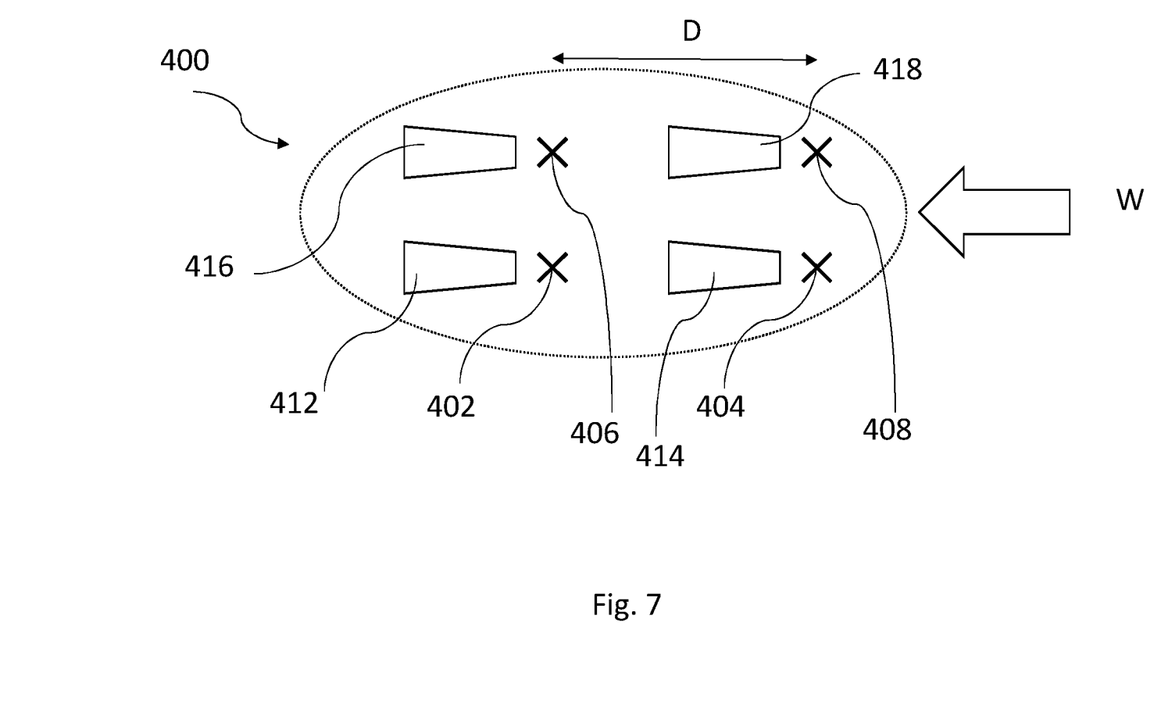
FIG. 7 shows a plan view of a wind turbine park.

FIG. 7 shows a plan view of a wind turbine park having four wind turbines 402, 404, 406, 408, the wind turbines 402, 404, 406, 408 producing respective wakes 412, 414, 416, 418 due to the prevailing wind direction W. The wind turbines are separated by a distance D.

The prevailing wind direction W for each wind turbine park 400 is a primary consideration when constructing a wind turbine park. Considering the prevailing wind direction W, it will be understood that the wind turbine 408 is upwind of the wind turbine 406 and the wind turbine 404 is upwind of the wind turbine 402. Therefore, the wake 418 produced by the wind turbine 408 will reduce the effective wind speed encountered by the wind turbine 406 and the wake 414 produced by the wind turbine 404 will reduce the wind speed encountered by the wind turbine 402.

In order to reduce the effect of each wake on the wind turbine downstream thereof, wind turbines which are upwind may be fitted with wind turbine blades having a greater degree of bend-to-twist coupling than the wind turbines downwind.

A common problem encountered by wind turbines upwind in a wind turbine park 400 is that the wind speed may more frequently exceed the operating cut off wind speed for the wind turbines to operate and so the wind turbines must be stopped in order avoid damage. However, by using blades having a greater bend-to-twist coupling, the upwind wind turbines may be tailored to operate at greater wind speeds. A second, related advantage is that, at high wind speeds, upwind turbines may produce smaller wakes such that more energy can be produced by downwind turbines.

It will be understood that downwind turbines might not be exactly downwind of upwind turbines in the predominant direction of prevailing wind, but may still be substantially affected by the wake from the upwind turbine when wind is blowing in the prevailing direction.

Similarly, wind turbines having different bend-to-twist couplings may be sited when they are not separated in a windward direction, such as if the wind speed is not uniform across a wind turbine park in a direction normal to the wind direction.

Figure 8:
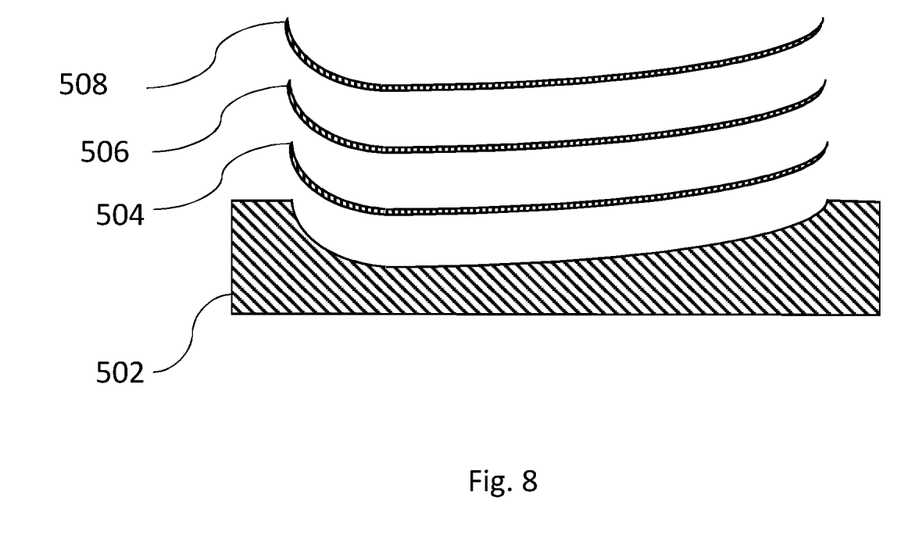
FIG. 8 shows how plies may be arranged within a mould.

FIG. 8 shows schematically how a series of plies 504, 506, 508 may be laid up within mould 502 in a method of forming a wind turbine blade or a wind turbine blade portion.

In a method, given by way of example only, ply 504 may be laid up in the mould 502, followed by ply 506 and 508. The plies 504 506 508 may then by infused with a resin material and a wind turbine blade may be formed. Subsequent to the wind turbine blade being released from the mould 502, another ply identical to ply 504 may be laid up within the mould and a ply 506 with fibres oriented at a different angle from that of the ply 506 used to manufacture the first blade may be laid up on top of the ply 504 with a ply 508 laid on top of the second ply 506. These plies may then be infused with a resin material and removed. Thus, two different wind turbine blades, having different structural characteristics, may be formed by the same mould 502. Of course, if pre-preg plies are used then the infusion step can be omitted.

An advantage of the method for manufacturing the wind turbine blades or wind turbine blade portions described above is that the same mould 502, or a number of moulds substantially identical in shape to mould 502, may be used in order to manufacture wind turbine blades usable in a greater number of situations. Where a number of moulds of substantially identical shape are used this still has the advantage that only a single tool plug is needed, so is much cheaper than making blades using a number of differently shaped moulds.

Advantages of fine tuning the bend-to-twist coupling of blades, blade portions or rotors, includes: fine tailoring of the wind turbines to the site specific conditions or to the pad specific conditions; fine tailoring of the AEP by employing the correct amount of bend-to-twist coupling for each pad; and fine tailoring of single turbines by row to fully exploit the thrust reduction implied by high levels of bend-to-twist coupling leading to a power increase for downwind turbines.

Although the invention has been described above with reference to one or more preferred embodiments, it will be appreciated that various changes or modifications may be made without departing from the scope of the invention as defined in the appended claims.

The invention claimed is:

1. A kit of parts for a plurality of wind turbine blades, comprising a plurality of wind turbine blades or a plurality of wind turbine blade portions each having:
an outer blade shell and a structural support connected to the outer blade shell, wherein the outer blade shell includes an outer blade shell region spaced from the structural support in a chordwise direction, the outer blade shell region including a plurality of composite plies, each ply of the outer blade shell region having a position within the respective outer blade shell of the wind turbine blade or the respective wind turbine blade portion and a fibre orientation angle relative to a pitch axis of the respective outer blade shell of the wind turbine blade or the respective wind turbine blade portion,
wherein each of the wind turbine blades or each of the wind turbine blade portions have substantially the same size and outer geometrical shape and corresponding pitch axes, and
wherein at least one ply of each of the respective outer blade shell regions of the wind turbine blades or the respective outer blade shell of the wind turbine blade portions corresponds, which corresponding plies have the same position within the respective outer blade shell of the wind turbine blades or wind turbine blade portions and have different fibre orientation angles such that the wind turbine blades or wind turbine blade portions have different bend-to-twist couplings.

2. The kit of parts of claim 1, wherein the fibre orientation angles of the corresponding plies differ by at least 5°.

3. The kit of parts of claim 1, wherein the fibre orientation angles of the corresponding plies differ by less than 35°.

4. The kit of parts of claim 1, wherein the corresponding plies are unidirectional plies, biaxial plies or triaxial plies.

5. The kit of parts of claim 1, wherein the outer blade shell includes an upper blade shell portion and a lower blade shell portion, and wherein the corresponding plies are located in each of the upper and lower blade shell portions of the respective wind turbine blades or respective wind turbine blade portions.

6. The kit of parts of claim 1, wherein the corresponding plies have substantially the same ply thickness, matrix material and fibre material.

7. The kit of parts of claim 1, wherein the corresponding plies differ by one or more of their ply thickness, matrix material or fibre material.

8. The kit of parts of claim 1, wherein each wind turbine blade or each wind turbine blade portion has a plurality of plies which correspond.

9. The kit of parts of claim 1, wherein the wind turbine blade portions are wind turbine blade tip portions.

10. The kit of parts of claim 9, further comprising a plurality of substantially identical wind turbine blade root portions, wherein each wind turbine blade tip portion is coupleable to one of the wind turbine blade root portions.

11. A plurality of wind turbine blades formed at least partially from the kit of parts of claim 1, each blade comprising one of the plurality of wind turbine blades or one of the plurality of wind turbine blade portions.

12. A plurality of wind turbine rotors, each rotor comprising a plurality of wind turbine blades, the blades of each rotor being substantially identical, and the blades being formed at least partially from the kit of parts of claim 1, and the blades of different rotors comprising a respective one of the plurality of wind turbine blades or one of the plurality of wind turbine blade portions.

13. A wind turbine park, comprising a plurality of wind turbines comprising the plurality of wind turbine rotors of claim 12, each wind turbine having one of the plurality of wind turbine rotors, and an adjacent pair of the wind turbines being spaced apart by a distance less than five times a diameter of one of the wind turbine rotors.

14. The wind turbine park of claim 13, wherein the wind turbine park has a predominant wind direction, and a first wind turbine is positioned relative to a second wind turbine in an upwind direction, according to the predominant wind direction, and wherein the blades of the first wind turbine have a greater bend-to-twist coupling than the blades of the second wind turbine.

* * * * *